UNITED STATES PATENT OFFICE.

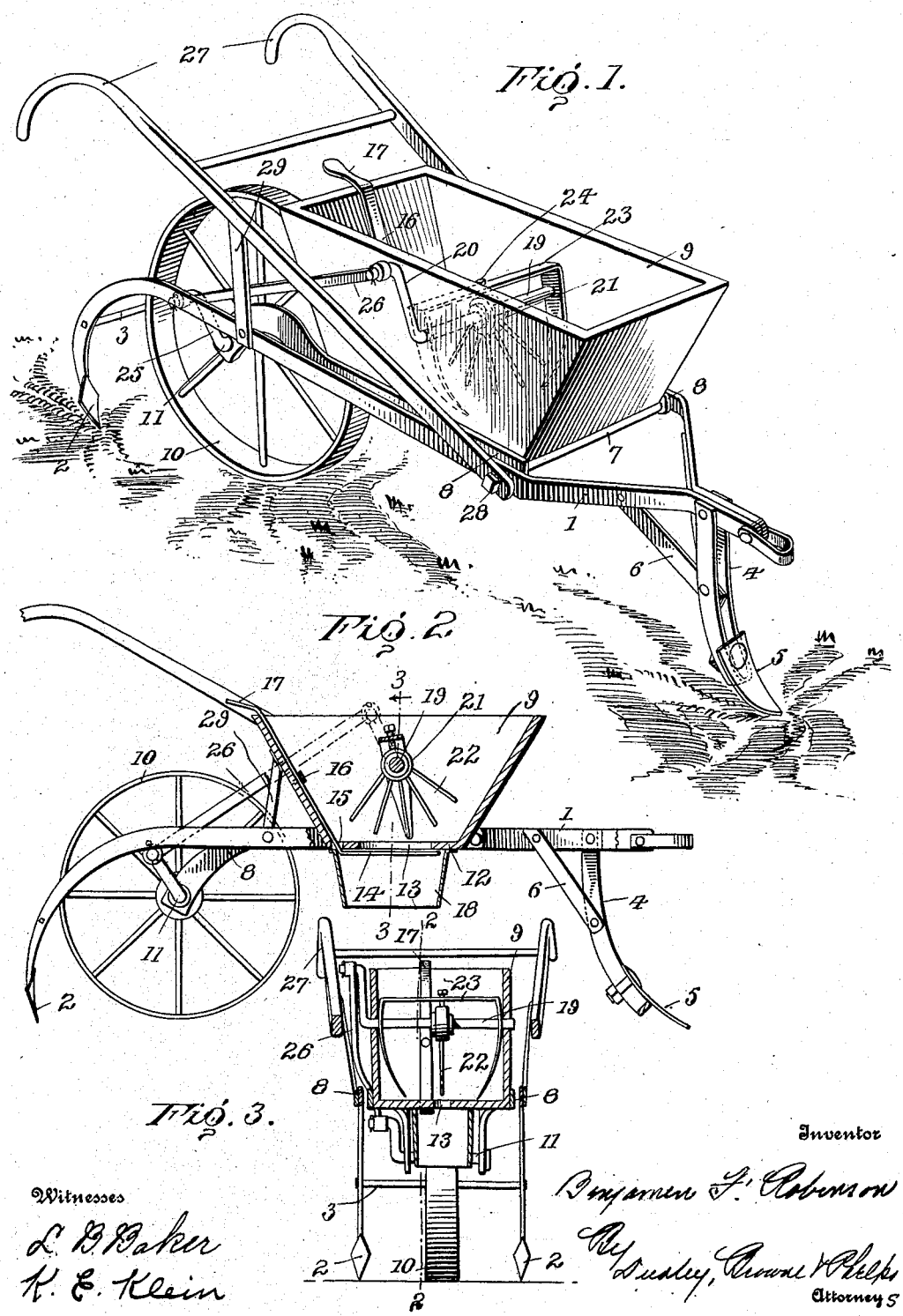

BENJAMAN FRANKLIN ROBINSON, OF CAMP HILL, ALABAMA.

SEED-PLANTER.

No. 900,784.

Specification of Letters Patent.

Patented Oct. 13, 1908.

Application filed May 20, 1908. Serial No. 433,810.

*To all whom it may concern:*

Be it known that I, BENJAMAN FRANKLIN ROBINSON, a citizen of the United States, residing at Camp Hill, in the county of Tallapoosa and State of Alabama, have invented certain new and useful Improvements in Seed-Planters, of which the following is a specification.

My invention relates to certain new and useful improvements in cotton and other seed planters, and one object of my invention is to provide a construction in which the seeds will be fed at an equal rate, deposited at an equal depth and evenly covered.

Another object of my invention is to provide a structure of this character which will be simple and cheap in construction, composed of few parts, durable and not likely to get out of order.

With these and other objects in view my invention consists in certain constructions, combinations and arrangements of parts, the preferred form of which will be first described in connection with the accompanying drawing and then the invention particularly pointed out in the appended claims.

Referring to the drawing wherein the same part is designated by the same reference numeral wherever it occurs, Figure 1 is a perspective view of the preferred form of my invention; Fig. 2 is a section taken on line 2—2 of Fig. 3, and Fig. 3 is a section taken on line 3—3 of Fig. 2, looking in the direction of the arrow.

1, 1 designate a pair of bars connected at their front ends and extending outwardly from each other and rearwardly, the lower ends being curved downwardly and carrying the covering plows 2, 2. The rear ends of the arms are held in position by means of the brace rod 3. At the forward end the arms at their point of connection are provided with the downwardly extending plow standard 4, carrying at its lower end the opening plow 5, the plow standard being shown as braced from the bars 1, 1 by the braces 6, 6.

Pivoted on the rod 7 extending between the bars 1, 1 are a pair of arms 8, 8 which, for a distance rearward from the rod, extend parallel with each other and between which is secured the seed hopper 9. Behind the seed hopper the bars extend toward each other, and in their lower ends is journaled a wheel 10, the wheel being journaled in the arms 8 by means of the shaft or axle 11, to which the wheel is fast.

The hopper 9 is, preferably, and as shown, formed with parallel sides and inclined ends, and the bottom 12 thereof is provided with a slot 13 through which the seed pass, the slot being controlled by a valve 14 extending below the same with one end extending up through a slot 15 in the bottom 12 and pivoted at 16 on the rear end of the hopper with the end above the pivot extending above the top of the hopper to form an operating handle 17.

Secured to the underside of the bottom 12 of the hopper and extending downwardly therefrom is a spout 18 by which the seed are directed into the furrow opened by the plow 5 after they drop through the slot 13.

19 is a shaft journaled in the sides of the hopper 9 and provided on one end exteriorly of the side of the hopper with a crank 20. Mounted on the shaft 19 and in line with the slot 13 is a sector shaped seed agitator, formed of a hub 21 provided with radial fingers 22 extending from the lower side of the hub and in close proximity to the upper edge of the slot 13.

23 is a U-shaped frame through the side arms of which extends the shaft 19, the free ends of the U extending down adjacent to the bottom of the hopper and, preferably, being bent toward each other.

Both the hub 21 and the U-shaped agitator are preferably secured to the shaft 19 by means of the set screw 24 passing through both the U-shaped frame and the hub and impinging against the shaft 19. The shaft 11 of the centrally disposed wheel 10 is provided on one side of the wheel with a crank 25 which is connected to the crank 20 of the shaft 19 by means of the link 26. The crank 25 is shorter than the crank 20, so that the rotation of the wheel 11 as the frame is drawn over the ground produces an oscillation of the shaft 19, which oscillates the sector shaped agitator and the fingers of the U-shaped agitator, and causes the seed to be fed evenly and steadily through the seed slot 13.

Preferably and as shown, the handles 27 are secured at their front ends to the frame 1 by means of the pivot rod 7 being held onto the rod by means of the nuts 28. 29, 29 are a pair of braces which connect the handles to the bars 1 near their rear, causing the handles to be rigidly connected to the frame carrying both the furrow opening and furrow closing plows.

In the operation of my seeder the seed hopper is filled with cotton seed, and the planter drawn over the ground. The valve 13 operates to open and close the slot 13, and consequently controls the feed of the seed. As the seeder is drawn over the ground the plow 5 opens the furrow into which the seed are dropped through the slot 13 and pressed down by the wheel 10, passing thereover, the furrow being closed by the plows 2. The rotation of the wheel 10 operates through the cranks 20, 25 and link 26 to oscillate the sector shaped seed agitator carried on the shaft 19 and also the U-shaped agitator, consequently causing the seed to be evenly fed through the slot 13 and into the furrow. As the frame carrying the wheel 11 and the feed hopper 9 is pivoted at the front end of the plow-carrying frame 1 the hopper will be shaken by all the inequalities of the ground over which the wheel 10 passes, thus assisting the even feed of the seed.

I realize that considerable variation is possible in the details of construction and arrangement of parts without departing from the spirit of my invention, and I therefore do not intend to limit myself to the specific form shown and described.

What I claim as new and desire to secure by Letters Patent is:

1. In a seed planter the combination with a plow carrying frame, and a wheel and seed hopper carrying frame, of an agitator arranged in the seed hopper and comprising a shaft journaled in the sides thereof and having a U-shaped agitator mounted thereon and a hub mounted on the shaft and having radial arms extending therefrom, and means connecting the supporting wheel and agitator shaft whereby the former is operated in the movement of the latter.

2. In a seed planter, the combination with an outer plow carrying frame, an inner frame, a seed hopper mounted on said inner frame, a wheel journaled therein, a seed agitator in the hopper comprising a shaft extending across the same, a U-shaped frame mounted on said shaft, a sector-shaped agitator mounted on the shaft and having radial arms extending downwardly in line with the feed opening in the bottom of the hopper, and connections between the seed agitator and the wheel whereby the former is operated in the revolution of the latter.

In testimony whereof I affix my signature in presence of two witnesses.

BENJAMAN FRANKLIN ROBINSON.

Witnesses:
GUILFORD McCORD,
W. H. PAYNE.